United States Patent

[11] 3,590,325

| [72] | Inventors | James W. McMillen<br>Monroeville;<br>Michael J. Onofrey, West Mifflin, both of, Pa. |
|---|---|---|
| [21] | Appl No. | 19,630 |
| [22] | Filed | Mar. 16, 1970 |
| [45] | Patented | June 29, 1971 |
| [73] | Assignee | Westinghouse Electric Corporation<br>Pittsburgh, Pa. |

[54] UNDERVOLTAGE DETECTION AND ENERGY STORAGE TRIP CURRENT
6 Claims, 1 Drawing Fig.

[52] U.S. Cl. .................................................. 317/31,
317/33 R, 317/54, 317/148.5 R, 317/151, 320/40,
340/248 B

[51] Int. Cl. ........................................ H02h 3/24
[50] Field of Search............................................ 317/31,
151, 33 R, 54, 148.5 R, 23; 340/248 B; 320/40

[56] References Cited
UNITED STATES PATENTS

| 2,482,524 | 9/1949 | Vrooman | 317/54 X |
| 2,735,039 | 2/1956 | Schuh | 317/54 X |

*Primary Examiner*—James D. Trammell
*Attorneys*—A. T. Stratton and C. L. McHale

ABSTRACT: A circuit for sensing an undervoltage condition of a circuit breaker control power supply voltage. This circuit upon sensing the low voltage prevents the circuit breaker from being closed if it is open and opens the circuit breaker if it is closed and at the same time may actuate an alarm.

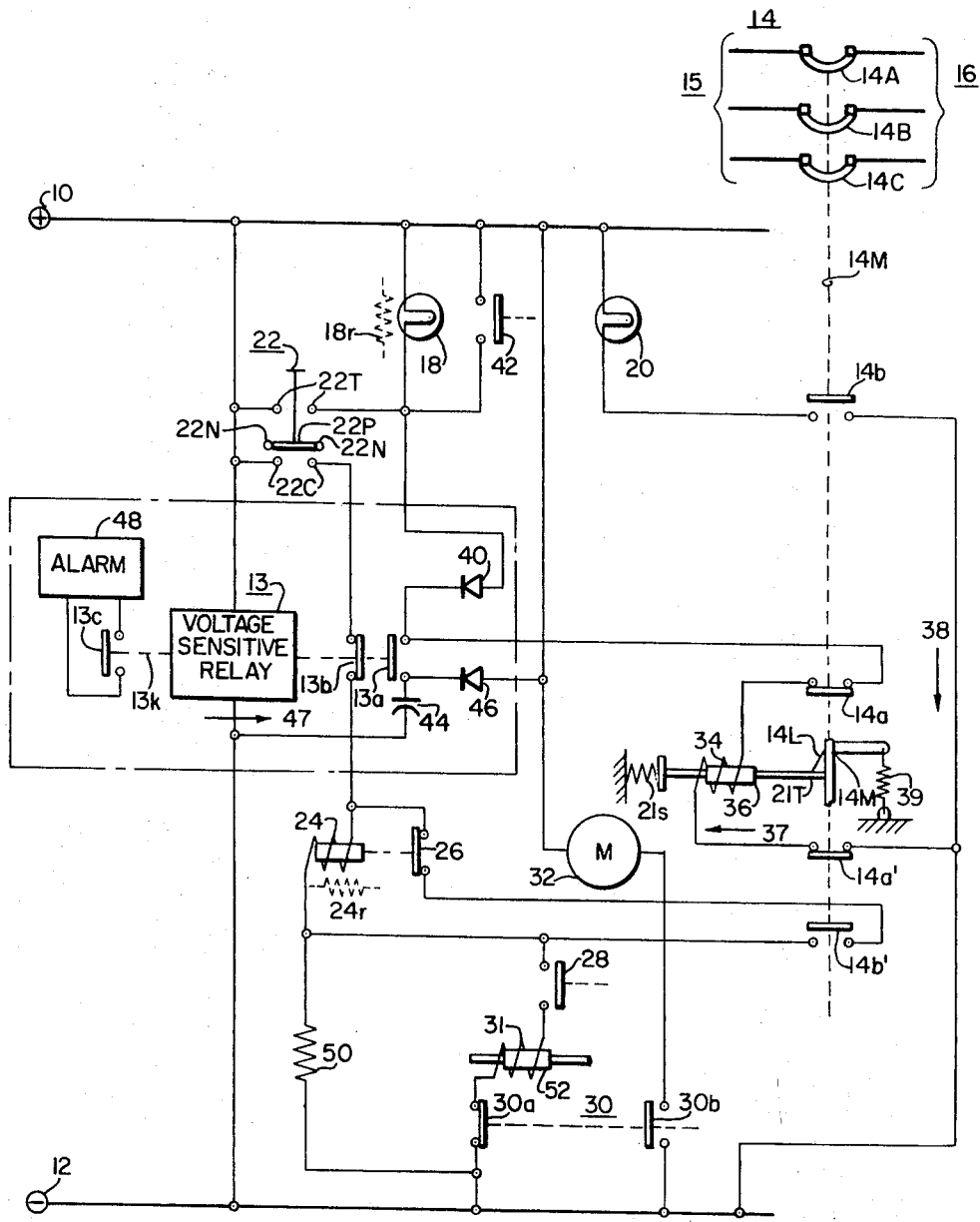

UNDERVOLTAGE DETECTION AND ENERGY STORAGE TRIP CURRENT

BACKGROUND OF THE INVENTION

This invention relates to circuit breaker control circuits and has particular relationship to devices which sense low electrical voltage in the control circuit and act to safeguard the circuit breaker system by guaranteeing that the main breaker is open. Modern high power circuit breakers are often controlled by electrical circuitry. This circuitry, in turn, is energized by some source of electric power, usually a direct current source. In the event that this source should fail, the main circuit breaker would be without a control system and thus the very operating conditions for which the circuit breaker was designed to protect against may occur and continue unabated because of power failure in the control circuit. The control circuit may actuate the opening of the circuit breaker under two conditions; normal operation and in the presence of a serious fault in the protected circuit. In both cases, the circuit breaker acts to isolate expensive electrical equipment.

SUMMARY OF THE INVENTION

The invention lies in the detection of lower than a minimum or predetermined power supply voltage for an electrical control circuit for a circuit breaker. The sensing of an undervoltage condition may be accomplished by various means, one of which is a voltage sensitive relay connected to the control power supply lines. If the source voltage drops below a predetermined minimum value, the operating coil of the voltage sensitive relay will respond to actuate the contacts of the relay to change operating positions to thereby actuate the associated relays and/or coils from their normal operating positions. After sensing the low voltage, the voltage sensitive relay causes the main circuit breaker to open if it is closed by discharging current from a capacitor or other energy storage element through the trip coil of the circuit breaker. This capacitor storage element has preferably been precharged through diodes from the control circuit power supply. Concurrently, the voltage sensitive relay disconnects the main power supply from the spring release closing coil of the circuit breaker thus disabling the closing mechanism and preventing any closure of the circuit breaker by manually actuated means. Finally, the voltage sensitive relay having a normally open contact connected in series with an alarm circuit closes, giving either a visual or audio warning or both that a low voltage control power supply problem exist.

The object, therefore, of this invention is to protect costly electrical equipment or circuits by insuring that circuit breakers which isolate this equipment from sources of dangerous overload currents properly and safely operate. One of the ways to guarantee proper control of these circuit breakers is to assure that a loss of power supply voltage or a drop in power supply voltage for the circuit which controls the breaker will be detected and proper action taken to guarantee that the main circuit breaker opens or remains open as the case may be and at the same time warns the operator that there is an undervoltage situation which should be corrected. This causes temporary loss of power to the electrical facilities to which the circuit breaker is connected but insures that no dangerous fault currents will be permitted to flow through the circuit breaker to these facilities.

BRIEF DESCRIPTION OF THE DRAWING

Other objects of the invention will be apparent from the following detailed description taken in conjunction with the accompanying drawing, in which:

FIG. 1 is a schematic drawing of a circuit breaker control system embodying the invention.

DESCRIPTION OF THE PREFERRED EMBODIMENTS

Referring to the drawing, power supply terminals 10 and 12 are shown. Terminal 10 is the positive terminal of a direct current power supply and terminal 12 is the negative or return terminal of the power supply. Connected in series with these terminals is an undervoltage relay system 13. Undervoltage relay system 13 has three sets of relay contacts, namely, contacts 13a, 13b and 13c. The circuit breaker control system causes circuit breaker 14 to open and close under certain conditions. As is shown in the drawing, circuit breaker or interrupter 14 is shown in the closed position such that the three-phase input circuit 15 is connected to the three-phase protected circuit 16 by the main contacts 14A, 14B and 14C of the circuit breaker 14. These contacts are ganged or mechanically actuated by the same linkage or mechanism 14M along with auxiliary contacts 14b and 14b' which are normally open when the circuit breaker contacts 14A, 14B and 14C are closed and the auxiliary contacts 14a and 14a' which are normally closed under the same circumstances. When circuit breaker 14 is in a closed operating condition light or lamp 18 with internal resistance 18r is lit or illuminated and current flows through a series circuit which includes light 18, diode 40, auxiliary contact 14a, coil 34 and auxiliary contact 14a' to the return or negative terminal 12 of the power supply. It will be noted that internal resistance 18r of lamp or light 18 must be of a magnitude so large as to normally prevent a voltage drop across coil 34 which is sufficient to cause current to flow through said coil which would energize it. When circuit breaker 14 is closed, indicating light or lamp 20 which is normally illuminated green to indicate a safe condition is not energized or lit because auxiliary contact 14b which is connected in series with the light 20 is open thus preventing energization of light or lamp 20.

It should be noted that circuit breaker 14 is held in its closed position by the action of latch member 21T which engages or is in contact with mechanism 14M at catch or latch surface 14L. Latch 21T is part of an operating mechanism which is held in position by the force of biasing spring 21S. Circuit breaker 14 normally remains closed so long as circuit breaker control switch contact 22P is in the neutral position 22N. Also when circuit breaker control switch 22 is in this position, no control power can be applied to coil or relay pickup 24 even though undervoltage relay contact 13b is closed and provides a path for current or power to coil 24. Since no power is applied or available to coil 24, its relay contact 26 is in its normally closed position. This is the Y-type or antipump relay which is well known in breaker the circuit breader control system art. In addition, auxiliary contact 14b' of the circuit breaker 14 is normally open and latch check switch contact 28 is normally open when circuit interrupter 14 is closed. Such being the case, even though motor switch 30 is in an operating condition such that contact 30a is closed, no control power can energize spring release coil 31 so as to attempt to close an already closed circuit breaker 14.

Circuit breaker 14 can only be opened by one of three occurrences. First, circuit breaker 14 can be opened in the normal fashion through the use of manually operable circuit breaker control switch 22. In this case, opening of circuit breaker 14 is accomplished by moving contact 22P from its normal position 22N to its trip position 22T. Current then flows from positive power supply terminal 10 through a series circuit which includes diode 40, normally closed auxiliary contact 14a, trip coil 34, normally closed auxiliary contact 14a' to the negative or return power terminal 12. It will be noted that the light 18 and its associated internal resistance 18r are shorted out by moving control switch 22 to its trip position 22T. This has the effect of removing the high resistance 18r from the control power circuit and allowing sufficient power to flow through relay coil 34 to move magnetic core or plunger 36 in a general direction 37, so as to compress spring 21S and to move trip trigger or latch 21T away from latch surface 14L so that the mechanical linkage 14M is moved in a direction 38 by the action of opening spring 39. When this occurs, auxiliary contacts 14b and 14b' are closed, auxiliary contacts 14 and 14a' are opened and main contacts 14A, 14B and 14C are opened thus isolating circuits 15 and 16 from each other.

A second way that the circuit breaker 14 can be opened is by the sensing of a fault in either circuit 15 or 16 and a subsequent closing of contact 42 in response to the sensing of this fault or overload of current or power. When contact 42 of a suitable protective relay (not shown) closes, it accomplishes the same effects as the moving of switch 22 to position 22T as previously described. That is, the closing of contacts 42 shorts out light or lamp 18 with its high internal resistance 18r and energizes trip coil 34.

A third way of opening circuit breaker 14 comprises the main embodiment of the teachings of the invention. It will be noted that an energy storage means or capacitor 44 is connected to negative power supply terminal 12 on one side and to positive power supply terminal 10 through diode 46 on the other side. This circuit arrangement has the effect, upon initial connection, of charging capacitor 44 to the control power supply voltage existing between terminals 10 and 12 of the circuit. During the operation of the voltage sensitive relay 13, when the voltage existing between terminals 10 and 12 of the DC power supply subsequently falls below a predetermined value, undervoltage relay 13, having been adjusted to sense this operating condition, will act to change the positions of relay contacts 13c, 13b, and 13a. These contacts are all ganged or mounted together rigidly on same linkage 13K and when an undervoltage situation is sensed, the linkage 13K will move in direction 47 thus closing contact 13a, opening contact 13b, and closing contact 13c. When contact 13a is engaged or closed, the energy or charge stored in an energy storage capacitor 44 discharges or flows as current through contact 13a and in the general direction of normally closed contact 14a of circuit breaker 14. Note that no current will flow through diode 46 or diode 40 as they are aligned or placed in the circuit to prevent current from flowing through them from the capacitor 44 because of reverse bias. Note also that an energy storage battery which may be rechargeable may be used in place of the energy storage capacitor 44. The current flowing through contact 14a will also flow through trip release coil 34 and through auxiliary contact 14a' to the negative terminal 12 of the power supply. The charge flowing from capacitor 44 is of sufficient magnitude to energize coil 34 thus moving magnetic core or plunger 36 in direction 37 and tripping circuit breaker 14 as previously discussed. It will be noted that since contact 13b is open, any subsequent attempts to close circuit breaker 14 through the use of pushbutton or switch 22 will be ineffective as the path to closing or spring release coil 31 is interrupted by the opening of contact 13b and therefore the circuit breaker 14 cannot be closed if it is initially open or reclosed once it has been opened by the action just described until the undervoltage operating situation present between terminals 10 and 12 of the power supply ends.

It should be noted that the closing of contact 13c in an undervoltage situation also actuates a visual or manual alarm 48. It should also be noted that in all three cases above, the opening of circuit breaker 14 causes auxiliary contact 14b to close which allows indicating light or lamp 20 to become illuminated. This lamp or light is normally green when illuminated and indicates that circuit breaker 14 is open. The opening of the circuit breaker 14 will cause motor limit switch 30 to change positions such that contact 30a is open and contact 30b is closed thus energizing motor 32 which charges a closing spring (not shown). This spring is subsequently used to supply the energy to close circuit breaker 14 upon the application of a valid closing current to spring release coil 31. Motor 32 will remain energized and in motion until the spring is fully charged in which case the motor will actuate switch 30 so that contact 30a is once again closed and contact 30b is opened removing power from the motor and preventing any further attempt to charge the closing spring.

In the event that the voltage between terminals 10 and 12 reestablishes itself or raises itself to above a certain predetermined value, undervoltage relay or sensing device 13 will sense this and change the positions of contacts 13a, 13b and 13c. Contact 13a will be opened preventing a tripping operation of circuit breaker 14 other than by the action of trip switch 22 or fault sense switch 42 as previously described. Contact 13c will be opened thus disabling alarm 48. Contact 13b will be closed so that circuit breaker 14 may be closed by changing the position of switch 22 such that contact 22P moves from its neutral position 22N to the closing position 22C. As previously described, this applies power to both the antipump relay 24 and spring release coil 31 provided that latch check switch 28 and motor limit relay contact 30a are closed. In that event, sufficient power is applied to spring release coil 31 to cause magnetic core 52 to move in such manner as to release the closing spring (not shown). The release of the closing spring will cause circuit breaker 14 to close such that mechanism 14M is in the position shown in FIG. 1 and trigger or trip latch 21T has engaged or locked latch 14L thus preventing subsequent opening of the circuit interrupter breaker 14 until one of the three previous described tripping actions occur.

Upon opening of contact 14b', the current flowing through contact 13b will divert into antipump relay coil 24 (with internal resistance 24r) thus opening contact 26 and preventing pumping of circuit breaker 14. Resistor 50 provides a path to terminal 12 for the current in coil 24 but is of such a low value that the voltage drop across it will not cause enough current to flow through coil 31 to energize it.

It should be noted that circuit breaker 14 although shown connected to a three-phase alternating current circuit can be used for any combination of phases including single phase. It is also to be understood that in certain applications the main embodiment of the invention may be used in other types of circuit breaker control circuitry.

The apparatus embodying the teachings of this invention has several advantages. It provides a failsafe mechanism for a circuit breaker control system such that a dropout of the undervoltage relay or undervoltage condition on the power supply to the circuit breaker control circuit will be sensed and responded to. Another advantage is that circuit breaker 14 will open regardless of a fault in the main circuit if an undervoltage condition is sensed on the control circuit power supply thus preventing damage to protected circuits.

Since numerous changes may be made in the above described apparatus and different embodiments of the invention may be made without departing from the spirit and scope thereof it is intended that all the matter contained in the foregoing description or shown in the accompanying drawings shall be interpreted as illustrative and not in a limiting sense.

We claim:

1. A control system for responding to a predetermined undervoltage condition in the control power supply for a circuit breaker having main separable contacts and including a trip coil and a closing means which may be selectively energized from said power supply, comprising voltage sensing means which connected to said power supply for changing from a first operating condition to a second operating condition when the voltage of said power supply decreases below a predetermined value, energy storage means connected to said power supply and normally having energy from said power supply stored at a predetermined level, said voltage sensing means having first means connected in circuit relation with said energy storage means and said trip coil for energizing said trip coil from said energy storage means when said voltage sensing means changes to said second operating condition to open said main contacts if said circuit breaker is closed, said voltage sensing means including second means connected in circuit relation with said closing means to prevent the energizing of said closing means from said power supply when said voltage sensing means changes to said second operating condition.

2. A system for the detection of and protection against the adverse effects of a low voltage in the power supply of a control circuit for a circuit breaker having a closing spring, a mechanical linkage, a trip coil, a closing coil and main contacts, comprising an undervoltage sensing device connected to said power supply, an energy storing means connected to said power supply, said energy storage means being capable of storing sufficient charge to flow at a rate capable of energizing said trip coil, said energy storage means deriving its charge initially from the power supply of the control circuit, said energy storage means being isolated from said power supply by a first diode connected between said energy storage means said power supply to permit only charging current to flow to said energy storage means from said power supply, a set of two contacts associated with the undervoltage sensing device, one of said contacts being normally open, the other of said contact being normally closed, said normally closed contact being connected in circuit relationship with the power supply and said closing coil, said trip coil being disposed upon energization to release said closing spring which actuates said mechanical linkage which closes the main contacts of said circuit breaker, said normally open contact being connected in circuit relationship with said energy storage means and said trip coil, said normally open contact having two terminals which are electrically isolated from said power supply at one terminal of said contact by said first diode and at the other terminal by a second diode connected between said contact and said power supply, said undervoltage sensing device being responsive to the presence of less than a predetermined voltage at the power supply of said control circuit to close the normally open contact connected between said energy storage means and the said trip coil thus energizing said trip coil to trip said circuit breaker and open said main contacts and to open the normally closed contact to prevent energizing said closing coil and the subsequent reclosing of said main contacts.

3. A system as described in claim 2, wherein said undervoltage sensing device has a normally open third contact, and an alarm and associated power supply is connected in circuit relationship with said third contact, said third contact being closed to activate the alarm upon the sensing of low voltage by the undervoltage sensing device.

4. A system as described in claim 3, wherein said energy storage means comprises an energy storage capacitor.

5. A system as described in claim 3, wherein said energy storage means comprises an energy storage battery.

6. A system as described in claim 5, wherein said energy storage battery comprises a rechargeable energy storage battery.